(12) United States Patent
Miyake et al.

(10) Patent No.: US 6,370,038 B1
(45) Date of Patent: Apr. 9, 2002

(54) PORTABLE ELECTRONIC DEVICE

(75) Inventors: Hideki Miyake, Osaka; Masami Makino, Gifu, both of (JP)

(73) Assignee: Sanyo Electric Co., Ltd., Moriguchi (JP)

(*) Notice: Subject to any disclaimer, the term of this patent is extended or adjusted under 35 U.S.C. 154(b) by 0 days.

(21) Appl. No.: 09/645,033

(22) Filed: Aug. 24, 2000

(30) Foreign Application Priority Data

Aug. 27, 1999 (JP) .......................................... 11-242162

(51) Int. Cl.[7] ................................................ H04B 1/03
(52) U.S. Cl. ...................... 361/814; 361/737; 361/752; 455/90
(58) Field of Search ................................ 361/736, 737, 361/727–730, 752, 759, 814; 455/90, 576–578; 379/440, 443, 445

(56) References Cited

U.S. PATENT DOCUMENTS 6,011,699 A * 1/2000 Murray et al. ............... 361/814
6,049,725 A * 4/2000 Emmert et al. .............. 455/573
6,064,894 A * 5/2000 Zurek et al. ................. 455/569

* cited by examiner

Primary Examiner—Jayprakash N. Gandhi
Assistant Examiner—Tuan Dinh
(74) Attorney, Agent, or Firm—Armstrong, Westerman & Hattori, LLP

(57) ABSTRACT

A portable electronic device comprises a casing 1, a first circuit board 3 provided in the interior of the casing 1, and a circuit module 5 attached to the first circuit board 3. The circuit module 5 comprises a chassis 51 engaged with the first circuit board 3 and a second circuit board 32 fixed to the chassis 51. A male connector 61 attached to one circuit board and a female connector 62 attached to the other circuit board are engaged with each other to have the both circuit boards electrically connected. The chassis 51 is formed with a pair of arms 52, 52 holding and supporting the respective end faces of the first circuit board 3 on respective end portions of the chassis 51. The pair of arms 52, 52 extends to the first circuit board 3 on respective end portions of the chassis 51, and an end portion of each arm 52 is held between an end face of the first circuit board 3 and the inner face of the casing 1. This prevents a male connector 61 and a female connector 62 from being impaired resulting from impulsive force exerted.

3 Claims, 5 Drawing Sheets

PORTABLE ELECTRONIC DEVICE

FIELD OF THE INVENTION

The present invention relates to portable electronic devices such as portable telephones, and more particularly to a construction of two circuit boards being secured in the interior of a casing.

BACKGROUND OF THE INVENTION

With reference to FIG. 4, conventional portable telephones comprise a casing 1 formed by a front case 11 and a rear case 12. A display 13 and a plurality of manual keys 14 including a seesaw key 15 are provided on the front case 11. The casing 1 has a first circuit board 3 disposed in its interior as shown in FIG. 5. Arranged on the first circuit board 3 are a key input device 4 to be depressed by the manual key 14, the display 13, a high-frequency circuit module 50, and a vibrator 2 comprising a motor 22 and an eccentric weight 21 attached to the output shaft of the motor for notifying the user of incoming calls, etc.

The high-frequency circuit module 50 comprises, as illustrated in FIG. 6, a chassis 51 having a surface of resin body processed with electroless plating, a second circuit board 32 fixed to the chassis 51 with screws fastened, and a shield case 55 attached to the second circuit board 32. A pair of arms 52, 52 extending on the opposite ends of the chassis 51 are engaged with the opposite ends of the first circuit board 3, having the high-frequency circuit module 50 attached to the first circuit board 3. A male connector 61 attached to the rear surface of the first circuit board 3 and a female connector 62 attached to the surface of the second circuit board 32 fit to each other, having the both boards 3, 32 electrically connected to each other.

With the conventional portable telephones, when external impulsive force is exerted on the casing 1, the first circuit board 3 and the high-frequency circuit module 50 must be prevented from moving in the casing 1. Such a construction, thus, is adopted that the opposite ends 31, 31 of the first circuit board 3 are engaged with ribs 10, 10 projecting inwardly of the casing 1, to prevent the first circuit board 3 from moving by the support of the interior of the casing 1.

However, with the above construction, a pair of arms 52, 52 extending on the chassis 51 are merely in engagement with opposite ends of the first circuit board 3, only to have the high-frequency circuit module 50 attached to the first circuit board 3. The high-frequency circuit module 50, thus, is not connected to the first circuit board 3 with the sufficient connecting strength to cause a relative shift between the first circuit board 3 and the second circuit board 32 in the event that external impulsive force is exerted. As a result, the problems are encountered including a male connector 61 and a female connector 62 are removed from the board or the portion wherein the male connector 61 is engaged with the female connector 62 is impaired.

SUMMARY OF THE INVENTION

An object of the present invention is to provide portable electronic devices comprising a first circuit board 3 and a second circuit board 32 disposed in an interior of a casing 1, a male connector 61 attached to one circuit board and a female connector 62 attached to the other board engaged with each other, and to prevent the male connector 61 and the female connector 62 from being impaired resulting from the exertion of the impulsive force.

The present invention provides a portable electronic device comprising the first circuit board 3 disposed in the interior of the casing 1, a circuit module 5 attached to the first circuit board 3. The circuit module 5 includes a chassis 51 engaged with the first circuit board 3 and the second circuit board 32 secured to the chassis 51. The male connector 61 attached to one circuit board and the female connector 62 attached to the other circuit board are engaged with each other to have the both circuit boards 3, 32 electrically connected.

On respective ends of chassis 51, a pair of arms 52, 52 holds and grips the respective end faces of the first circuit board 3. The pair of arms 52, 52 extends toward the first circuit board 3. Each upper end of the arms 52, 52 is held between an end face of the first circuit board 3 and an inner face of the casing 1.

With the portable electronic device, the invention not only adopts the construction that the chassis 51 of the circuit module 5 is engaged with the first circuit board 3, but also adopts the construction that the upper end of the pair of arms 52, 52 extending from the chassis 51 is held between an end face of the first circuit board 3 and an inner face of the casing 1. Therefore, the chassis 51 is connected to the first circuit board 3 with given more improved strength than in the prior art.

Accordingly, even if external impulsive force acts on the casing 1, there is no likelihood that relative shift occurs between the first circuit board 3 and the second circuit board 32. This prevents the male connector 61 and the female connector 62 from being impaired.

Stated specifically, the arm 52 of the chassis 51 contacts with the end face of the first circuit board 3 and with the inner face of the casing 1 on a plane including the first circuit board 3. With the specific construction, when external impulsive force acts on the casing, the force with which the first circuit board 3 presses the arm 52 and the force with which the inner face of the casing 1 receives the arm 52 are opposed on a same line, so that the impulsive force acts as force to compress the arm 52, causing no moment. As a result, the sufficient endurance is achieved in the event of the impulsive force exerted.

Further stated specifically, upper ends of a pair of arms 52, 52 extending from the chassis 51 are engaged with the respective ends of the first circuit board 3, to have the circuit module 5 attached to the first circuit board 3. According to the specific construction, the pair of arms 52, 52 extending from the chassis 51 also works as a construction to have the chassis 51 engaged with the first circuit board 3, giving the device simplified construction.

As stated above, the present invention provides the portable electronic device comprising the circuit module 5 which is connected to the first circuit board 3 with enough strength. Consequently, even if external impulsive force is exerted, the relative shift between the first circuit board 3 and the second circuit board 32 is avoided, to prevent the male connector 61 and the female connector 62 from being impaired.

DETAILED DESCRIPTION OF EMBODIMENTS

The portable telephones embodying the present invention will be described below in detail with reference to the drawings.

Figure 2:
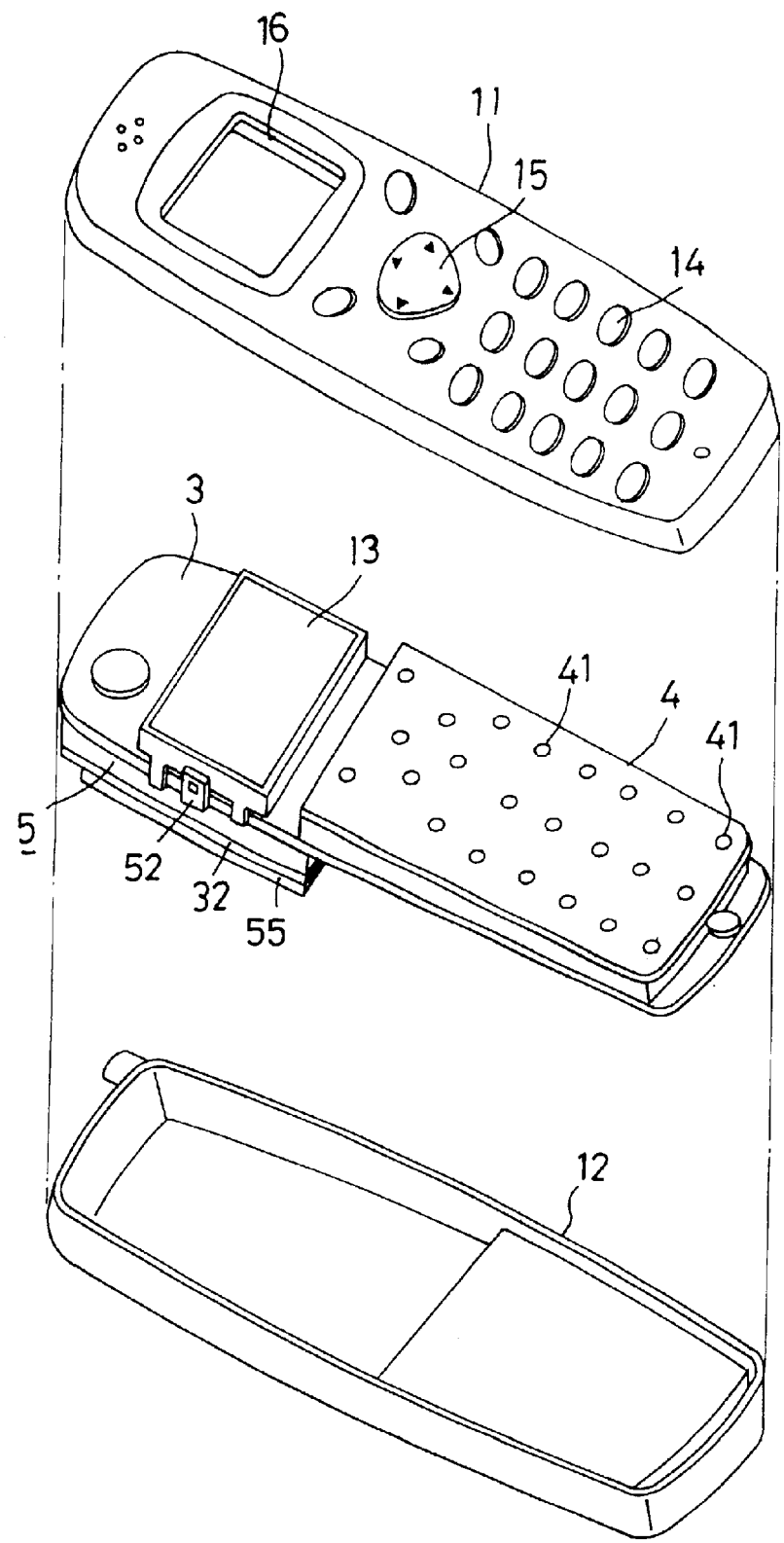
FIG. 2 is an exploded perspective view of the telephone.

Referring to FIG. 2, the portable telephone of the invention has a flat casing comprising a front case 11 and a rear case 12. Arranged on the front case 11 are a plurality of manual keys 14 including seesaw key 15. The front case 11 is formed with a window 16 exposing a display 13. Provided between the front case 11 and the rear case 12 is a first circuit board 3. The display 13 and a key input device 4 are arranged on a surface of the first circuit board 3, and a high-frequency circuit module 5 is arranged on a rear surface of the circuit board. The key input device 4 has a surface formed with a plurality of domes 41 to close key-contacts corresponding to the respective manual keys 14.

Figure 1:
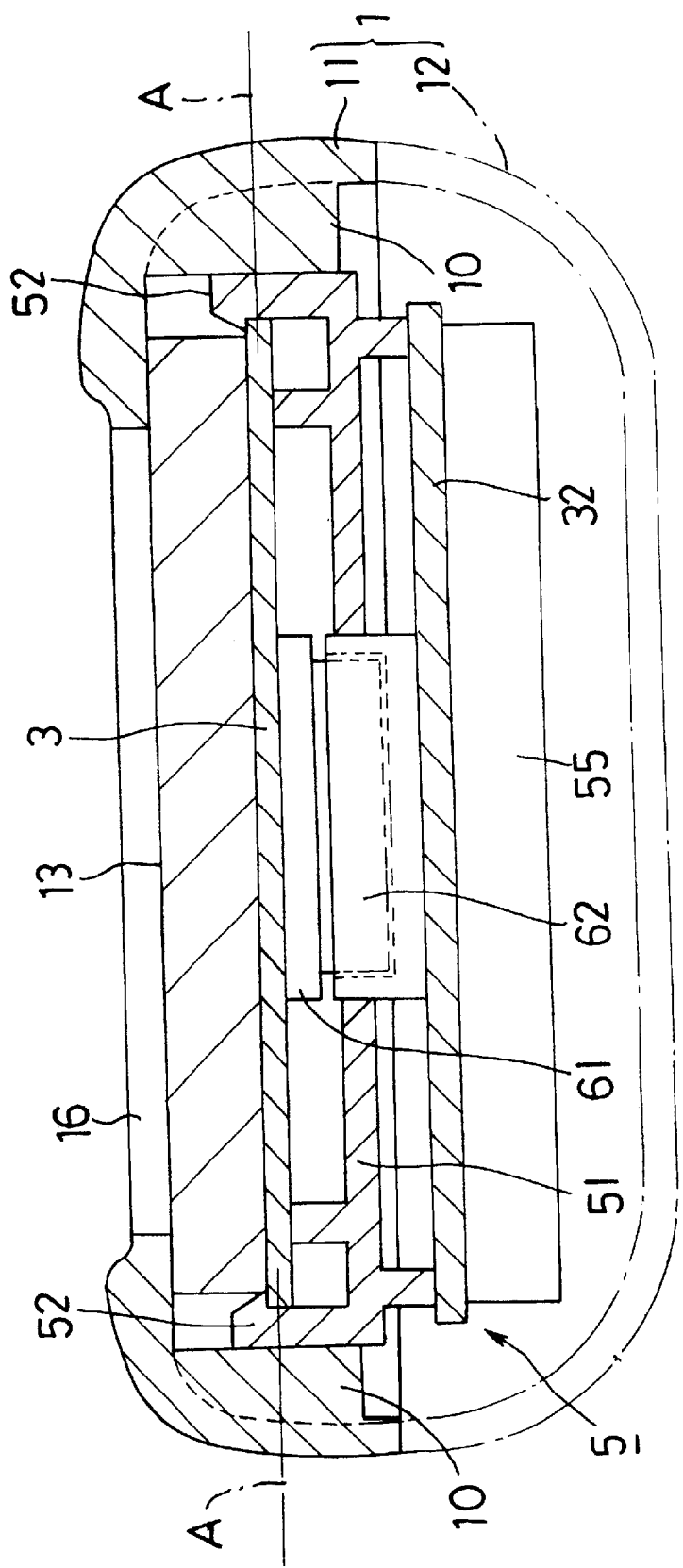
FIG. 1 is a view in section of the portable telephone according to the invention on an enlarged scale.
Figure 3:
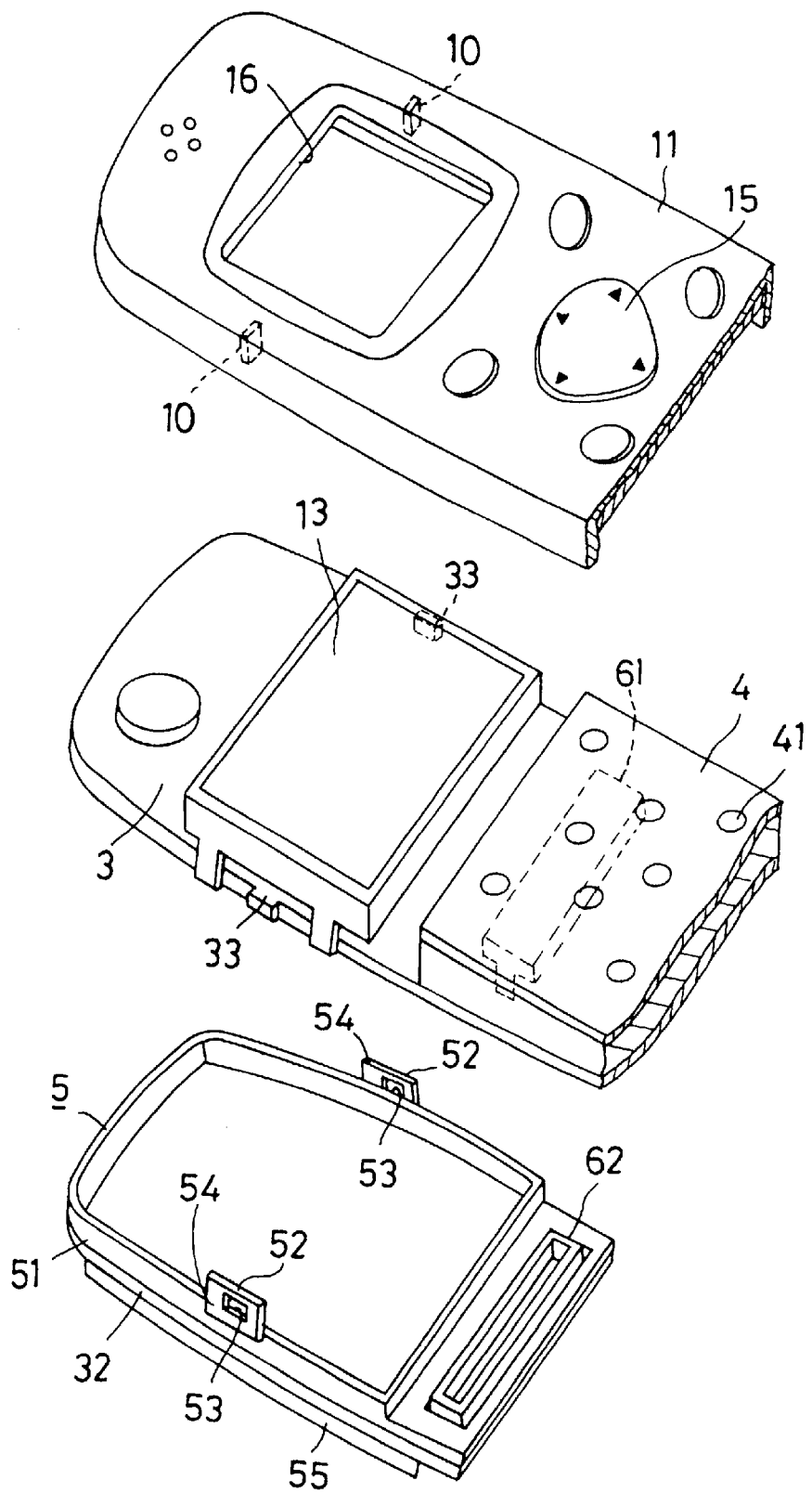
FIG. 3 is a fragmentary exploded perspective view of the telephone.
Figure 4:
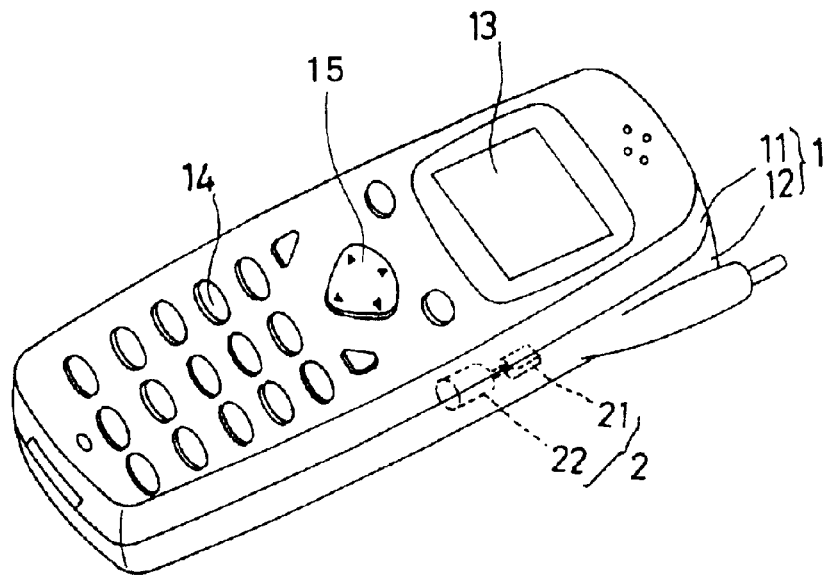
FIG. 4 is a perspective view showing the appearance of a conventional portable telephone.
Figure 5:
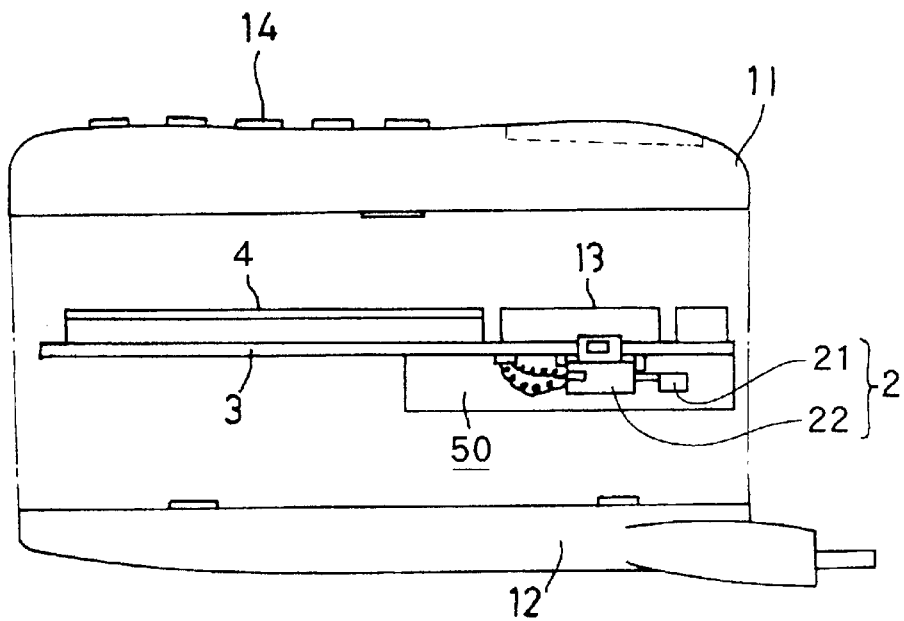
FIG. 5 is an exploded side elevation of the telephone.
Figure 6:
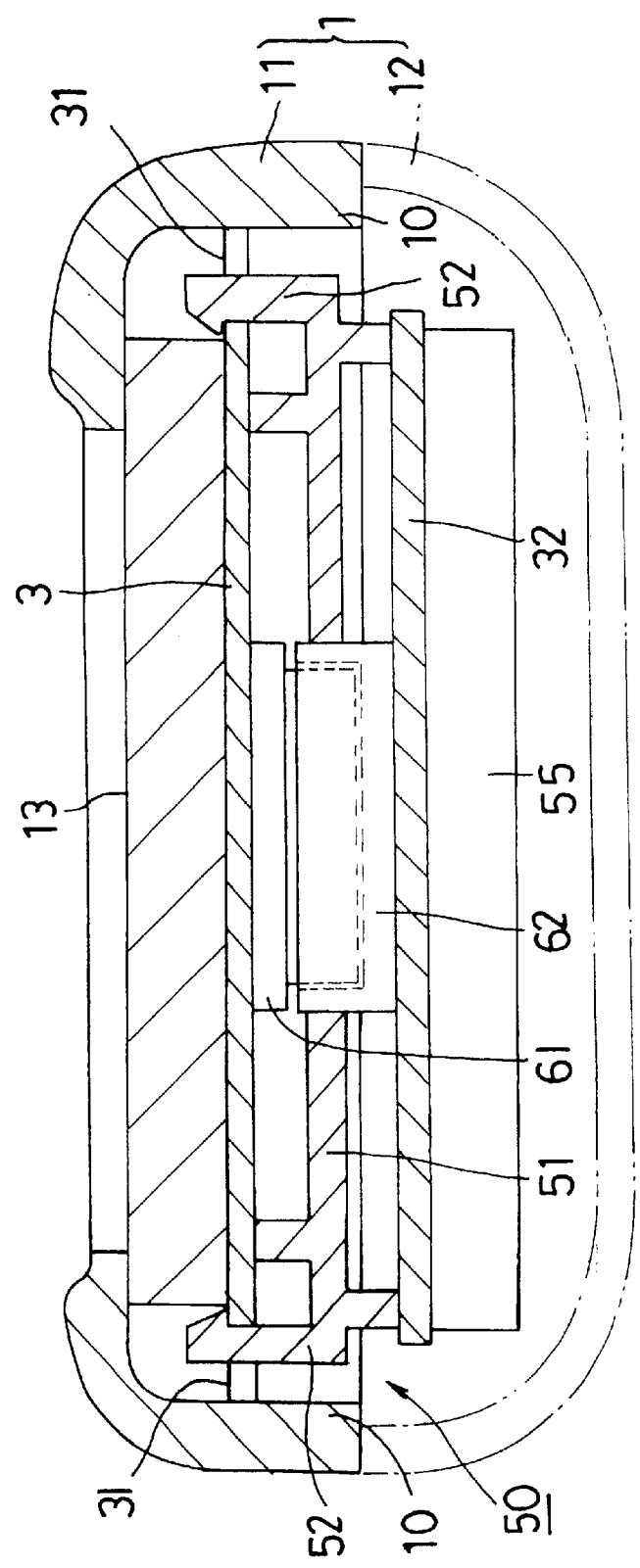
FIG. 6 is a view in section of the telephone on an enlarged scale.

FIG. 1 and FIG. 3 show the high-frequency circuit module 5 comprises a chassis 51 having a surface of resin body processed with electroless plating, a second circuit board 32 fixed to a rear surface of the chassis 51 with screws fastened, and a shield case 55 attached to a rear surface of the second circuit board 32. The chassis 51 is provided with a pair of arms 52, 52 extending upwardly on its latitudinal respective ends, and an each arm 52 is formed with a window 53.

On the other hand, a pair of projections 33, 33 are formed on opposite sides of the first circuit board 3 corresponding to the windows 53, 53 of the pair of arms 52, 52, respectively. The projections 33, 33 are engaged with the windows 53, 53 of the arms 52, 52, respectively, to have the high-frequency circuit module 5 attached to the first circuit board 3.

Furthermore, while a male connector 61 is attached to a rear surface of the first circuit board 3, a female connector 62 is attached to a surface of the second circuit board 32 with the high-frequency circuit module 5. The circuit board 3, as described above, is engaged with the high-frequency circuit module 5, whereby the male connector 61 and the female connector 62 are engaged with each other to have the both circuit boards 3, 32 electrically connected each other.

A front case 11 has a pair of ribs 10, 10, extending in its interior corresponding to respective ends 54, 54 of the pair of arms 52, 52 of the chassis 51. The first circuit board 3 and the high-frequency circuit module 5 are provided in the interior of the front case 11, whereby each upper end portion of each arm 52 of the chassis 51 is held between each end face of the first circuit board 3 and each end of the rib 10 of the front case 11.

Consequently, the high-frequency circuit module 5 is connected to the a first circuit board 3 with so high strength that relative shift will not occur between the first circuit board 3 and the second circuit board 32 even if external impulsive force is exerted. There is, therefore, no likelihood that the male connector 61 or the female connector 62 will be removed from the board and that the portion wherein the male connector 61 and the female connector 62 are engaged is impaired.

With the structure shown in FIG. 1, on a plane A including the first circuit board 3, the arm 52 of chassis 51 and an end portion of the first circuit board 3 contact with each other, and the arm 52 and the rib 10 of the casing 1 contact with each other. Accordingly, when external impulsive force is exerted, the force with which the first circuit board 3 depresses the arm 52 is opposed to and balanced with the force with which the rib 10 of the casing 1 receives the arm 52 of chassis 51 on the same line on the plane A. This makes the impulsive force act as a force to compress the arm 52, generating no moment. Consequently, sufficient endurance is achieved with the impulsive force exerted, and there is no likelihood that the rib 10 of the casing 1 will be deformed.

As a result, the construction that the arm 52 of the chassis 51 is held between the end portion of the first circuit board 3 and the rib 10 of the front case 11 will be maintained for a long period, not to reduce the strength with which the high-frequency circuit module 5 is connected to the first circuit board 3.

The end portion of the first circuit board 3 depresses the end face of the rib 10 of the casing 1 through the arm 52 of the chassis 51. Therefore, the concentrated stress on contacting surface with the external impulsive force exerted can be decreased if the arm 52 is so designed in shape and dimensions that the area wherein the arm 52 contacts with the end portion of the first circuit board 3 and the area wherein the arm 52 contacts with the rib 10 of the casing 1 are made sufficiently large.

The device of the present invention is not limited to the foregoing embodiment in construction but can be modified variously by one skilled in the art without departing from the spirit of the invention as set forth in the appended claims. For example, the present invention is not limited only to portable telephones but can be applied to various portable electronic devices like mobile computers.

What is claimed is:

1. A portable electronic device comprising a casing, a first circuit board provided in the interior of the casing, and a circuit module attached to the first circuit board, wherein the circuit module comprises a circuit module chassis engaged with the first circuit board and a second circuit board fixed to the circuit module chassis, a first connector attached to the first circuit board and a second connector attached to the second circuit board are engaged with each other to have the first and second circuit boards electrically connected, the circuit module chassis includes a pair of arms, holding and supporting respective end faces of the first circuit board, on respective end portions of the circuit module chassis, the pair of arms extends to the first circuit board on respective end portions of the circuit module chassis, and an arm end portion of each arm is in intimate contact with an end face of the first circuit board and the inner face of the casing and is firmly held therebetween.

2. The portable electronic device according to claim 1, wherein each arm of the circuit module chassis contacts with an end face of the first circuit board and the inner face of the casing on a plane including the first circuit board.

3. The portable electronic device according to claim 1, wherein the arm end portion of each arm extends from the circuit module chassis and the arm end portions are engaged with the opposite end faces of the first circuit board, whereby the circuit module is attached to the first circuit board.

* * * * *